(12) United States Patent
Yang et al.

(10) Patent No.: US 8,321,412 B2
(45) Date of Patent: Nov. 27, 2012

(54) DIGITAL DATA PROCESSING METHOD FOR PERSONALIZED INFORMATION RETRIEVAL AND COMPUTER READABLE STORAGE MEDIUM AND INFORMATION RETRIEVAL SYSTEM THEREOF

(75) Inventors: Yi-Hsuan Yang, Taipei (TW); Homer H. Chen, Taipei (TW)

(73) Assignee: National Taiwan University, Taipei (TW)

(*) Notice: Subject to any disclaimer, the term of this patent is extended or adjusted under 35 U.S.C. 154(b) by 144 days.

(21) Appl. No.: 12/839,637

(22) Filed: Jul. 20, 2010

(65) Prior Publication Data

US 2011/0022615 A1    Jan. 27, 2011

(30) Foreign Application Priority Data

Jul. 21, 2009 (TW) .............................. 98124627 A

(51) Int. Cl.
  *G06F 17/30* (2006.01)
(52) U.S. Cl. ................ 707/732; 707/736; 707/758
(58) Field of Classification Search .................. 707/705, 707/736, 732, 758
See application file for complete search history.

(56) References Cited

U.S. PATENT DOCUMENTS

| | | | |
|---|---|---|---|
| 6,146,103 A | 11/2000 | Lee et al. | |
| 6,185,534 B1* | 2/2001 | Breese et al. | 704/270 |
| 6,212,502 B1* | 4/2001 | Ball et al. | 704/270 |
| 6,221,260 B1 | 4/2001 | Chahine et al. | |
| 6,622,140 B1* | 9/2003 | Kantrowitz | 1/1 |
| 6,821,479 B1 | 11/2004 | Smith et al. | |
| 7,112,417 B2 | 9/2006 | Vyakarnam et al. | |
| 7,340,393 B2* | 3/2008 | Mitsuyoshi | 704/207 |
| 2003/0055654 A1* | 3/2003 | Oudeyer | 704/275 |
| 2004/0093354 A1* | 5/2004 | Xu et al. | 707/104.1 |
| 2006/0167694 A1* | 7/2006 | Mitsuyoshi | 704/270 |

FOREIGN PATENT DOCUMENTS

| | | |
|---|---|---|
| JP | 6294374 A | 10/1994 |
| JP | 8296547 A | 11/1996 |
| TW | 00538004 B | 6/2003 |
| TW | 267619 B | 12/2006 |
| TW | 270524 | 1/2007 |

OTHER PUBLICATIONS

Mark D. Korhonen and David A. Clausi, "Modeling Emotional Content of Music Using System Identification", Nov. 3, 2004, NSERC, 1083-4419, 2006 IEEE.*
Yi-Hsuan Yang et al., "Personalized Music Emotion Retrieval", Vancouver, Canada, MM'08, Oct. 23-27, 2008.
Yi-Hsuan Yang et al., "Mr. Emo: Music Retrieval in the Emotion Plane", ACM, 2008.
Yi-Hsuan Yang et al., "A Regression Approach to Music Emotion Recognition", Institute of Electrical and Electronics Engineers, 2007.

* cited by examiner

*Primary Examiner* — Thanh-Ha Dang
(74) *Attorney, Agent, or Firm* — Rabin & Berdo, P.C.

(57) ABSTRACT

A digital data processing method for information retrieval and an information retrieval system thereof are provided. In an embodiment, the information retrieval system trains a personalized model according to a user's feedback perceptions of at least one information piece. With respect to information pieces and different users, the information retrieval system performs estimation, based on two different stages with a generalized model and the trained personalized model.

17 Claims, 5 Drawing Sheets

DIGITAL DATA PROCESSING METHOD FOR PERSONALIZED INFORMATION RETRIEVAL AND COMPUTER READABLE STORAGE MEDIUM AND INFORMATION RETRIEVAL SYSTEM THEREOF

This application claims the benefit of Taiwan application Ser. No. 98124627, filed Jul. 21, 2009, the subject matter of which is incorporated herein by reference.

BACKGROUND OF THE INVENTION

1. Field of the Invention

The invention relates in general to a digital data processing method for information retrieval and a computer readable storage medium and an information retrieval system thereof, and more particularly to a digital data processing method for personalized information retrieval for simulating individual differences and a computer readable storage medium and an information retrieval system thereof.

2. Description of the Related Art

Along with the rapid growth in the volume of digital data, many information retrieval technologies for multi-media files are developed and provided one after another. For example, a highly subjective concept-based information retrieval technology, such as an information retrieval technology based on emotion, preferences, and aesthetics, emerges as an alternative of the conventional keyword-based information retrieval technology.

The highly subjective concepts disclosed above can be found in many literatures. For literatures regarding emotion, referring to "A Regression Approach to Music Emotion Recognition" by Y.-H. Yang et al (IEEE Transactions on Audio, Speech and Language Processing, vol. 16, no. 2, pp. 448-457, February 2008). For literatures regarding preference, referring to "Personalized Active Learning for Collaborative Filtering" by A. 0. Harpale and Y.-M. Yang (ACM SIGIR, pp. 259-266, 2008). For literatures regarding aesthetics, referring to "Computational Media Aesthetics: Finding Meaning Beautiful" by C. Dorai and S. Venkatesh (IEEE. MultiMedia, vol. 8, no. 4, October-December 2001, pp. 10-12).

However, human perception is very subjective and it is not an easy task to provide a general retrieval model applicable to everyone. For example, referring to FIGS. 1A-1D, emotion annotation for a two dimensional valence-arousal emotion plane is shown. In FIGS. 1A-1D, each of the planes of FIGS. 1A-1D illustrates the emotion annotations of a song in the valence-arousal emotion planes. Each circle corresponds to a user's annotation of a song. On the two-dimensional emotion plane, emotion is defined by valence (level of positivity/negativity) and arousal (degree of being excited or tranquil). The details of such definition are disclosed in related literatures of physiological psychology. As can be acknowledged from FIGS. 1A-1D, emotion perception varies greatly from person to person. Thus, estimating a particular user's perception of a song would not perform well in practice if the emotion value of each song is simply assigned in a deterministic manner.

SUMMARY OF THE INVENTION

The invention is directed to a digital data processing method for information retrieval and a computer readable storage medium and an information retrieval system. According to a perception of a user for retrieval, at least one information piece matching the perception of the user for retrieval is retrieved from a plurality of personal perception estimate of a plurality of information pieces, wherein each personal perception estimate denotes a subjective concept-based estimate of the user of one of the information pieces. In an embodiment, when obtaining the personal perception estimate, the system trains the personalized model by simulating individual differences through feedback from the user. Afterwards, a personalized perception estimate applicable to the user is obtained according to the personalized model and a generalized model. Thus, the estimation is more accurate and the effectiveness of the information retrieval is increased.

According to a first aspect of the invention, a digital data processing method for a retrieval system is provided. The method includes the following steps. First, a retrieval instruction is detected, wherein the retrieval instruction includes a perception for retrieval by a user. Next, in response to the retrieval instruction, at least one information piece matching the perception for retrieval is retrieved from a plurality of personal perception estimates associated with a plurality of information pieces, wherein each of the personal perception estimates denotes the user's subjective concept-based estimate associated with a corresponding one of the information pieces. Then, the at least one information piece retrieved is presented.

According to a second aspect of the invention, a computer readable storage medium is provided for storing multiple computer instructions. After an electronic device performs the computer instructions, the above digital data processing method for a retrieval system is performed.

According to a third aspect of the invention, a digital data processing method for a retrieval system is provided. The method includes the following steps. At least one feedback instruction is detected, wherein the feedback instruction includes at least one feedback perception, and each feedback perception indicates a user's feedback on one of a plurality of information pieces. For each feedback perception, a residual perception is determined according to comparison between the feedback perception and a general perception of the corresponding information piece. A personalized model is trained according to at least one corresponding feature and the corresponding residual perception of each information piece on which feedback is provided. Next, a corresponding personal perception estimate of each information piece for use in information retrieval is determined according to at least a generalized model and the trained personalized model, and an information retrieval service is provided accordingly, wherein each personal perception estimate represents the user's subjective concept-based estimate of the corresponding information piece.

According to a fourth aspect of the invention, a computer readable storage medium is provided for storing multiple computer instructions. After an electronic device performs the computer instructions, the above digital data processing method for a retrieval system is performed.

According to a fifth aspect of the invention, an information retrieval system is provided. The system includes a storage unit and a processing unit. The storage unit is used for storing a plurality of information pieces and a plurality of corresponding personal perception estimates, wherein each of the personal perception estimates denotes a user's subjective concept-based estimate associated with a corresponding one of the information pieces. The processing unit is used for detecting a retrieval instruction, wherein the retrieval instruction includes a perception for information retrieval. The processing unit, in response to the retrieval instruction, further retrieves at least one information piece matching the perception for information retrieval from the personal perception estimates associated with the information pieces and presents the retrieved at least one information piece.

According to a sixth aspect of the invention, an information retrieval system is provided. The system includes a database, a storage unit, and a processing unit. The storage unit is used for storing a plurality of information pieces and a plurality of corresponding personal perception estimates, wherein each of the personal perception estimates denotes a user's subjective concept-based estimate associated with a corresponding one of the information pieces. The processing unit is used for detecting a retrieval instruction, wherein the retrieval instruction includes a perception for information retrieval. The processing unit, in response to the retrieval instruction, further retrieves at least one information piece matching the perception for information retrieval from the personal perception estimates associated with the information pieces and presents the retrieved at least one information piece.

The above and other aspects of the invention will become better understood with regard to the following detailed description of the preferred but non-limiting embodiments. The following description is made with reference to the accompanying drawings.

DETAILED DESCRIPTION OF THE INVENTION

In an embodiment of the invention, a plurality of personal perception estimates of a plurality of information pieces are searched, according to a perception for retrieval by a user, for at least one information piece matching the perception of the user for retrieval, wherein each personal perception estimate denotes the user's subjective concept-based estimate for a corresponding one of the information pieces. Here, the subjective concept refers to the user's perception (such as level of sadness or happiness) of a particular information piece or content (such as music). In an embodiment, a digital data processing method for information retrieval and an information retrieval system are provided for obtaining the personal perception estimate by simulating the residuals of personal perception and general perception. In an embodiment, the generalized model is trained in advance for simulating the relationships between features and perceptions of the information pieces, and a personalized model is trained by the feedback obtained from the interaction with the user. Thus, the sum of the estimation of the personalized model and the estimation of the generalized model results in the personalized perception estimate close to that as expected. Such personalized perception estimate is applicable to the information retrieval system to provide information retrieval service so as to retrieve corresponding information pieces or contents. Embodiments are further provided as follows.

Figure 1A:
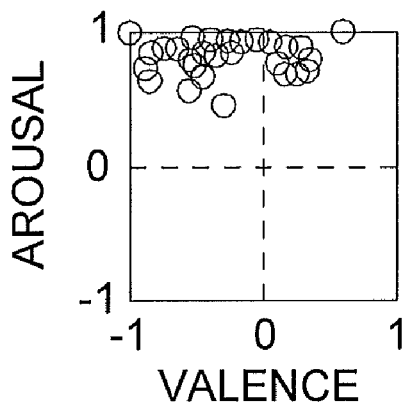
FIGS. 1A-1D show a two-dimensional valence-arousal emotion plane for emotion annotation.
Figure 1B:
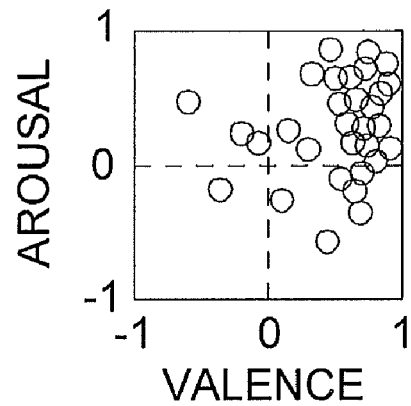
Figure 1C:
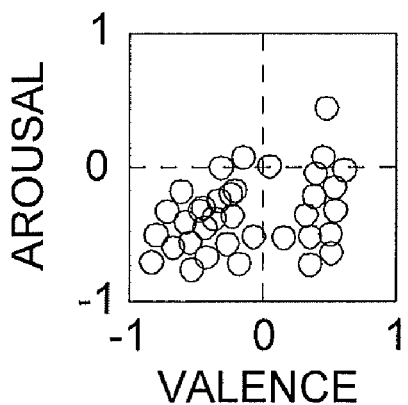
Figure 1D:
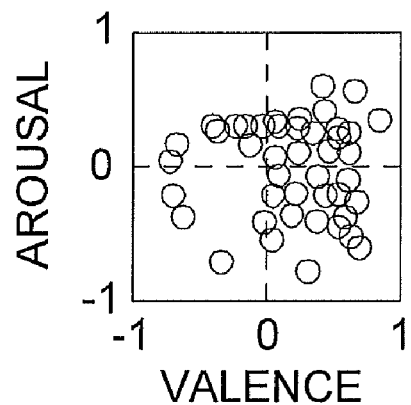
Figure 2:
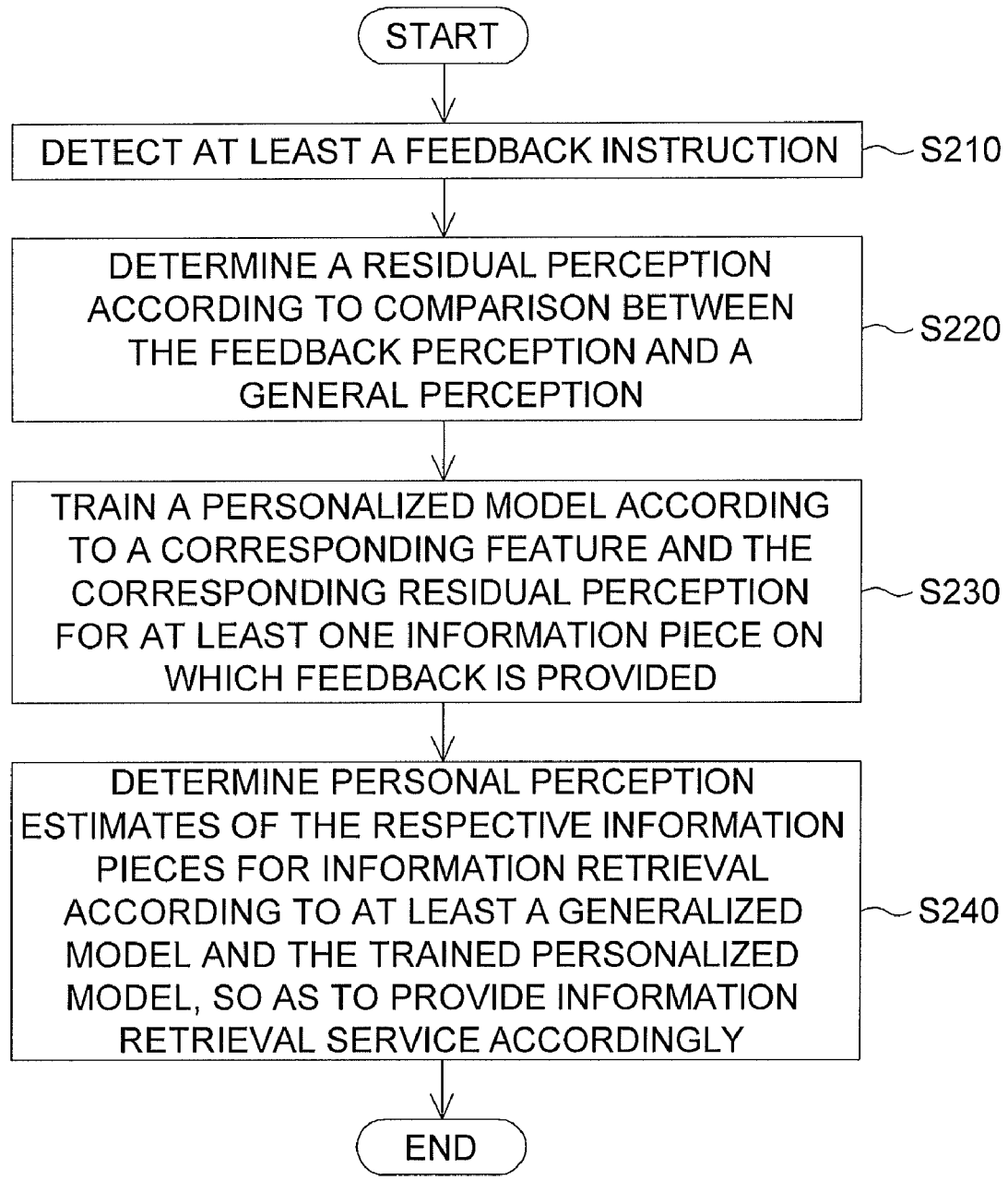
FIG. 2 shows a flowchart of a digital data processing method according to an embodiment of the invention.

Referring to FIG. 2, a flowchart of a digital data processing method according to an embodiment of the invention is shown. The method includes the following steps. First, as indicated in step S210, at least one feedback instruction is detected, wherein the feedback instruction includes at least one feedback perception corresponding to one of the a plurality of information pieces. Next, as indicated in step S220, a residual perception is determined according to comparison between the feedback perception and the corresponding general perception.

Then, as indicated in step S230, a personalized model is trained according to the corresponding feature and the corresponding residual perception of the at least one information piece corresponding to the at least one feedback perception. Afterwards, as indicated in step S240, the personal perception estimate for information retrieval of each information piece is determined according to at least the generalized model and the trained personalized model, so as to provide information retrieval service accordingly, wherein each personal perception estimate denotes the user's subjective concept-based estimate with respect to the information piece.

An information retrieval system using the digital data processing method of FIG. 2 is disclosed below with a number of accompanying drawings. First, referring to FIG. 3, an information retrieval system is shown according to an embodiment of the invention in a block diagram.

The information retrieval system 300 includes a database 310 and a server 320. The database 310 is for storing N information pieces and N corresponding personal perception estimates, wherein N is a natural number. The server 320 includes a processing unit 322 and a storage unit 324. The server 320 is connected to a network NW for providing information retrieval service to at least one of the computing devices PC1-PCn connected to the network NW, and the user can use information retrieval service through a computing device. The above computing device can be a car PC, a notebook computer, or a personal computer. In addition, the computing device can also be a computing device or a handheld device, such as a mobile phone, a PDA with network connectivity, or a multi-media player.

Figure 3:
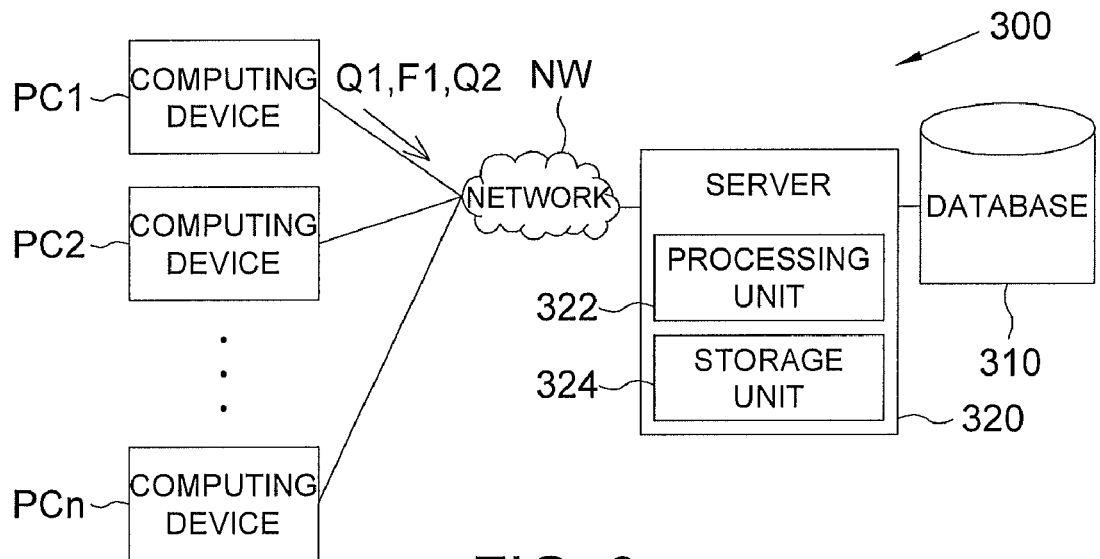
FIG. 3 shows a block diagram of an information retrieval system according to an embodiment of the invention.

In the information retrieval system of FIG. 3, in order to provide a personalized information retrieval service applicable to the user of each of the computing devices PC1-PCn, the server 320 can store, for example, in a storage unit 324: model parameters of a generalized model for providing general perception estimates; and model parameters of multiple personalized models, each of the personalized models providing a residual perception estimate applicable to the user of each of the computing devices PC1-PCn. In the following, the meanings of the two types of perception estimates and how to provide the two types of models are exemplified below.

Perception Estimate

General perception estimate: given an information piece, such as a document, an image, a piece of music, or video, each user's general perception (such as emotion, preferences, or aesthetics) with respect to the information piece is estimated.

Personal perception estimate: given an information piece, a particular user's persona perception with respect to the information piece is estimated.

Generalized Model

Figure 5A:
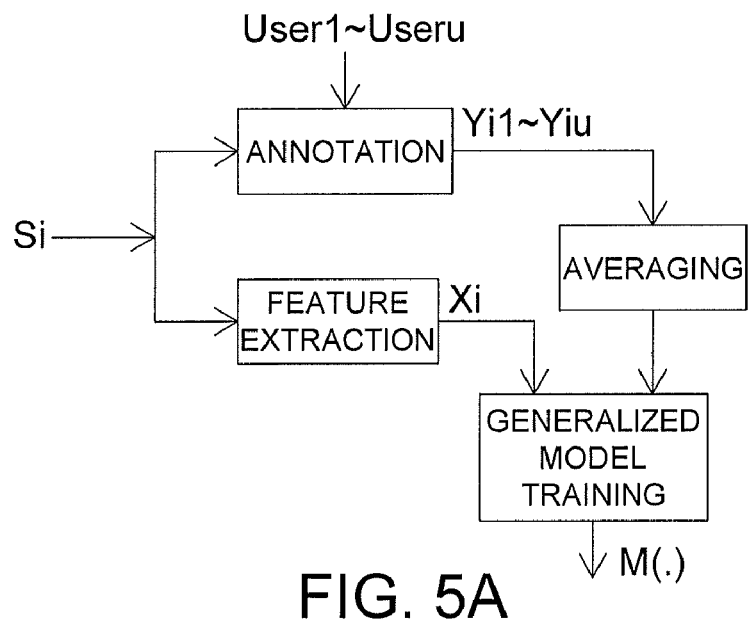
FIG. 5A shows an example of the training process of a generalized model.

The generalized model denotes the relationship between at least one corresponding feature and a plurality of corresponding predetermined perceptions of each information piece. Referring to FIG. 5A, an example of the training process of a generalized model is shown. In an embodiment, the generalized model is trained by the N information pieces S1-SN stored in the database 310. An $i^{th}$ information piece is annotated by multiple users User1-Useru in advance, and after annotation, multiple labels are provided and used as the corresponding predetermined perceptions Yi1-Yiu of the $i^{th}$ information piece Si, wherein i is a natural number smaller than or equal to N. That is, the first information piece S1 corresponds to multiple predetermined perceptions Y11-Y1u. In another embodiment, provision of labeling with respect to a portion of the information pieces, rather than all of the information pieces S1-SN, is enough for training the generalized model M (.). Thus, the generalized model M (.) can be constructed by the portion of the information pieces.

During the training process, a corresponding feature Xi of the $i^{th}$ information piece Si is obtained. Each feature Xi can be defined according to different types of information pieces. In practical application, the multiple information pieces include one or more than one type of multi-media files, such as music file, image file, video file, or text file. In the present embodiment, the parameters of the features are analyzed in response to the files, so as to determine the features meaningful to various types of files. For example, in terms of the music files, examples of the features include rhythm, tone, and Mel-frequency cepstral coefficient (MFCC). In terms of the image files, examples of the features include color and texture. In terms of the video files, examples of the features include switching speed of scene or frame. In terms of the text files, examples of the features include key words of a particular topic and other parameters of discourse analysis such as grammar features, style, formal and colloquial. In another embodiment of the invention, the corresponding features of various types of files can be designed to meet the situations and the needs.

After that, the generalized model M (.) is trained according to the corresponding feature Xi and the corresponding multiple predetermined perceptions Yi1-Yiu of the $i^{th}$ information piece Si. With respect to an information piece S1, for example, the generalized model M (.) is trained according to the corresponding feature X1 and the multiple corresponding predetermined perceptions Y11-Y1u of the information piece S1. In practical application, an average of the predetermined perceptions Y11-Y1u of the information piece S1 can be computed, and the generalized model M (.) is trained according to the feature X1 and the average of the predetermined perceptions Y11-Y1u. Training refers to minimize the error between the M(Xi) and the average value of the predetermined perceptions Yi1-Yiu. However, the training of the generalized model M (.) of the present embodiment is not limited thereto.

Thus, after the training is completed, the generalized model represents the relationship between the corresponding feature and the corresponding predetermined perceptions of each information piece, so as to provide the corresponding general perception estimate of an information piece. For example, the generalized model M (.) can provide the corresponding N general perception estimates Y1g-YNg (not illustrated in FIG. 5A) of the N information pieces S1-SN. In a practical example, the generalized model is provided to the server 320, for example, after the training is completed, and then model parameters of the generalized model are stored in the storage unit 324.

Personalized Model

The personalized model indicates the relationship between the corresponding feature and a corresponding residual perception of at least one $i^{th}$ information piece on which feedback is provided. In the following, the computing device PC1 is taken for example to illustrate how the processing unit 322 of the present embodiment train a personalized model according to the feedback of the computing device PC1.

Figure 4:
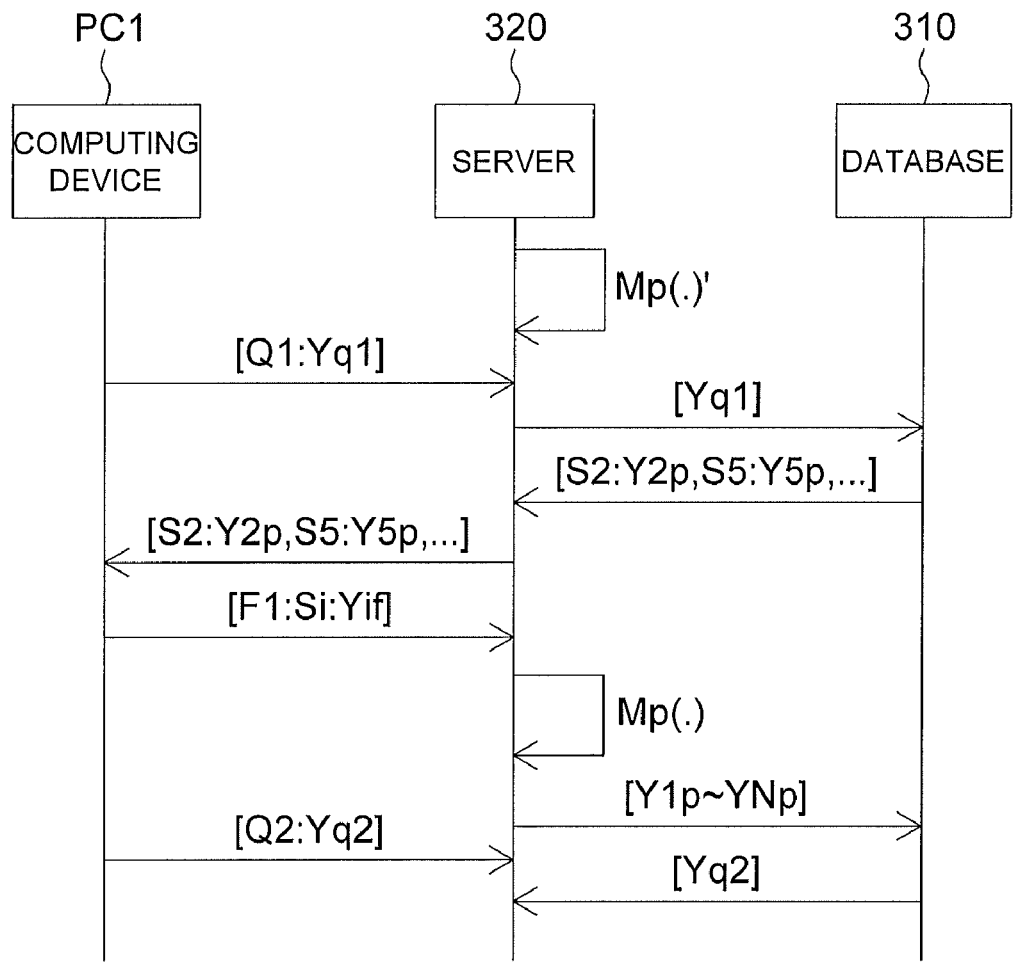
FIG. 4 shows a sequence diagram of an embodiment of performing a digital data processing method in the information retrieval system of FIG. 3.

Referring to FIG. 4, a sequence diagram is shown as an embodiment of performing a digital data processing method in the information retrieval system of FIG. 3. First, the storage unit 324 provides a personalized model Mp (.)' for initializing the computing device PC1.

Then, a retrieval instruction Q1 outputted from the computing device PC through the network NW is detected by the server 320, wherein the retrieval instruction Q1 includes a perception for retrieval Yq1. The server 320, according to the perception for retrieval Yq1, search the personal perception estimates Y1p-YNp (not illustrated in FIG. 4) of the N information pieces S1-SN in the database 310. Meanwhile, as the personalized model Mp (.)' is initialized, the personal perception estimates Y1p-YNp are equal to the general perception estimates Y1g-YNg provided by the generalized model M (.).

When searching the personal perception estimates Y1p-YNp, the server 320 retrieves the information piece corresponding to similar perception, such as the information pieces [S2, S5, . . . ] whose perceptions [Y2p, Y5p, . . . ] are similar or approximate to the perception for retrieval Yq1. Afterwards, the server 320 provides the retrieval result, for example, the information pieces [S2, S5, . . . ], to the computing device PC1.

Then, the user of the computing device PC1 gives feedback on the information pieces [S2, S5, . . . ] provided by the information retrieval system 300 so as to provide a feedback instruction F1. The feedback instruction F1 includes at least one feedback perception Yif corresponding to an $i^{th}$ information piece Si of the N information pieces S1-SN, wherein i is a natural number smaller than or equal to N.

For example, for the information pieces [S2, S5, . . . ] provided by the information retrieval system 300, the feedback instruction F1 includes feedback perceptions Y2f and Y5f of the second and fifth information piece S2 and S5 respectively. Meanwhile, the processing unit 322 trains the personalized model Mp (.) in response to the feedback instruction F1. In another embodiment, the training can be performed after a certain number of feedback perceptions are obtained. For example, the training is performed after 5 or 10 information pieces on which feedback is provided are obtained.

Figure 5B:
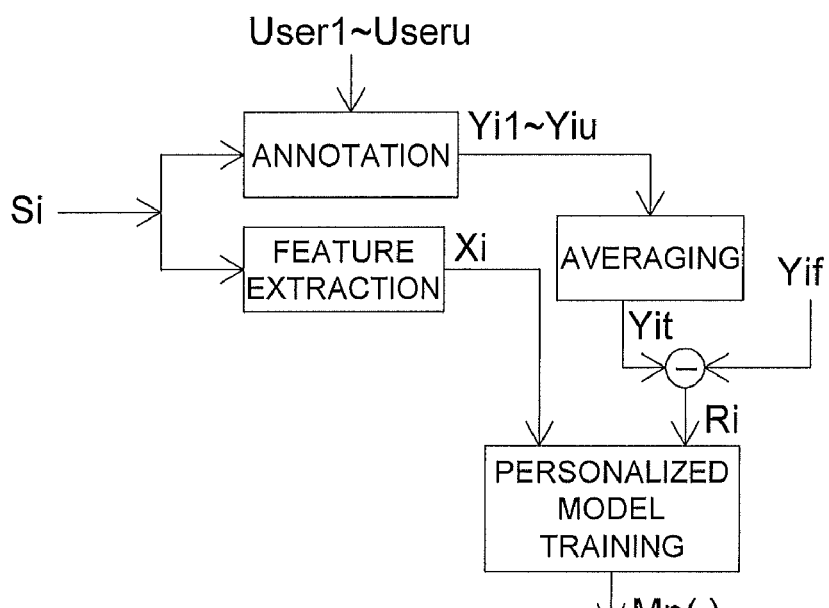
FIG. 5B shows an example of the training process of a personalized model.

Referring to FIG. 5B, an example of the training process of a personalized model is shown. In FIG. 5B, the processing unit 322 of FIG. 3 trains the personalized model Mp (.) in response to the feedback instruction F1. After detecting the feedback instruction F1, the processing unit 322 further determines a residual perception Ri according to the comparison between the feedback perceptions Yif and a general perception Yit corresponding to the $i^{th}$ information piece Si on which feedback is provided.

For example, the general perception Yit can be obtained according to the predetermined perceptions Yi1-Yiu of the $i^{th}$ information piece Si. The comparison result between the feedback perceptions Yif and the general perception Yit is their distance, for example, a one-dimensional difference or a two dimensional Euclidean distance. In an embodiment, the general perception Yit is, for example, an average of multiple predetermined perceptions Yi1-Yiu of the $i^{th}$ information piece Si. However, it is not limited to this example and a general perception Yit can also be a value based on the predetermined perceptions Yi1-Yiu.

Then, the processing unit 322 further trains the personalized model Mp (.) so as to change a model parameter of the personalized model Mp (.) according to the corresponding feature Xi and the corresponding residual perception Ri of the $i^{th}$ information piece Si. Here, training refers to minimizing the error between the Mp (Xi) and the residual perception Ri, wherein i is obtained according to the user's feedback.

For example, with respect to the second information piece S2, the processing unit 322 determines a residual perception R2 according to the difference between the feedback perceptions Y2f and the general perception Y2t (for example, the average of the predetermined perceptions Y21-Y2u) of the $2^{nd}$ information piece S2. The residual perception R5 of the fifth information piece S5 can also be obtained in a similar way. Afterwards, the processing unit 322 trains the personalized model Mp (.) according to the corresponding features X2 and X5 and the corresponding residual perceptions R2 and R5 of the two information pieces S2 and S5 respectively, so as to minimize the error between the Mp (Xi) and the residual perception Ri, wherein during the training process, i is assigned as 2 and 5 in order.

Thus, in the present embodiment, a personalized model can be trained according to the feedback of the user of the computing device PC1. The personalized model can then represent the relationship between the corresponding feature and a corresponding residual perception of at least an $i^{th}$ information piece of the N information pieces and can provide a corresponding residual perception estimate for an information piece.

Figure 5C:
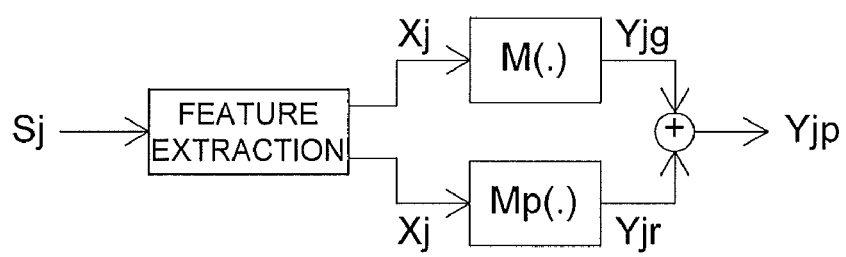
FIG. 5C shows an example of determining the personal perception estimates of N information pieces according to the generalized model of FIG. 5A and the personalized model of FIG. 5B.

In the present embodiment, after a personalized model is obtained according to the user's feedback, the corresponding personal perception estimates Y1p-YNp of the N information pieces S1-SN can be determined again. Referring to FIG. 5C, an example of determining the personal perception estimates of N information pieces is shown according to generalized model of FIG. 5A and the personalized model of FIG. 5B. In this example, the processing unit 322 determines the personal perception estimate of each of the N information pieces at least according to the generalized model M (.) and the trained personalized model Mp (.). For example, the processing unit 322 can determine the personal perception estimate Yjp of a $j^{th}$ information piece Sj in order, wherein j is a natural number smaller than or equal to N.

To put it in greater details, in an embodiment, when determining the personal perception estimate Yjp of the $j^{th}$ information piece Sj, the processing unit 322 can determine whether the $j^{th}$ information piece is an information piece on which feedback perception has been provided by the user of the computing device PC1, and then determine the personal perception estimate Yjp according to the result of determination.

If it is determined that the user has never provided any feedback perception on the $j^{th}$ information piece, then the processing unit 322 obtains the corresponding general perception estimate Yjg of the $j^{th}$ information piece Sj through the generalized model M (.) and obtains the corresponding residual perception estimate Yjr of the $j^{th}$ information piece Sj through the trained personalized model Mp (.). Then, the processing unit 322 further determines the personal perception estimate Yjp of the $j^{th}$ information piece Sj according to the sum of the general perception estimate Yjg and the residual perception estimate Yjr.

If it is determined that the user has provided a feedback perception on the $j^{th}$ information piece, then the processing unit 322 determines the personal perception estimate Yjp of the $j^{th}$ information piece Sj according to the feedback perceptions Yif. For example, the feedback perceptions Yif is used as the personal perception estimate of the $j^{th}$ information piece Sj.

Thus, as indicated in FIG. 4, after the personal perception estimates Y1p-YNp are determined again, the server 320 stores the personal perception estimates Y1p-YNp in the database 310, and associates the personal perception estimates Y1p-YNp with the N information pieces S1-SN in order to provide retrieval service. Thus, the server 320 can provide information retrieval service for use by the computing device PC1 according to the generalized model and the trained personalized model.

After that, as indicated in FIG. 4, if the processing unit 322 further detects a retrieval instruction Q2, which includes a perception for retrieval Yq2, then the processing unit 322 again search the personal perception estimates Y1p-YNp of the N information pieces according to the perception for retrieval Yq2.

Thus, the user of the computing device PC1 can feedback again according to the retrieval result provided by the server 320, so that the server 320 again trains the personalized model Mp (.) according to the feedback. Thus, the much feedback the user provides, the closer to the user's expectation the retrieval result provided the server 320 will be; the estimation of the server 320 is more accurate and the effectiveness of the information retrieval is increased.

In a practical example, the above perception such as one-dimensional value denotes the user's perception from sadness to happiness and ranges from 0 to 1, and the label provided by the user ranges from −1 and 1 for example. In other embodiment, the perception can also be denoted in a two-dimensional plane, and the value of each dimension denotes a particular perception. Meanwhile, when providing information retrieval service to the user, the server can provide a two-dimensional graphical user interface, such as associated with a two-dimensional valence-arousal emotion plane for emotion annotation as indicated in FIGS. 1A-1D, for the user to click, wherein each point clicked by the user corresponds to an input point in the plane coordinates. Likewise, the two dimensional personal perception estimate of each information piece can also correspond to a test point in the plane coordinates. In other embodiment, two dimensional personal perception estimates can be inputted by inputting two values or by a user interface with two sliders. Thus, when retrieving, the server can determine a nearer test point(s) according to the distance between the input point and the test point.

In an embodiment, the digital data processing method and the information retrieval system can also be used for determining the personal perception estimate of an additional test information piece. Here, additional test information piece refers to information piece different from the N information pieces S1-SN stored in the database 310. Meanwhile, the way in which the server 320 determines the personal perception estimate is similar to the way of determining the personal perception estimate Yjp as indicated in FIG. 5. In other words, the server 320 further performs feature extraction on the additional test information piece so as to obtain one or more features of the test information piece, as exemplified above. Afterwards, the server 320 obtains a corresponding general perception estimate of the test information piece according to the feature of the test information piece and the generalized model M (.). Then, the server 320 obtains a corresponding residual perception estimate of the test information piece according to the feature of the test information piece and the personalized model Mp (.). Lastly, the server 320 determines the personal perception estimate of the test information piece according to the sum of the general perception estimate and the residual perception estimate.

As is disclosed in the above embodiments of the invention, the generalized model and the personalized model are trained, for example, by support vector regression (SVM). However, it is not limited thereto. The digital data processing method for information retrieval and the information retrieval system disclosed here can train the generalized model and the personalized model by any machine learning methods, such as regression analysis, artificial intelligence algorithm, gene algorithm, or artificial neural network, so as to learn the relationships between the feature and the perception of each information piece.

Figure 5D:
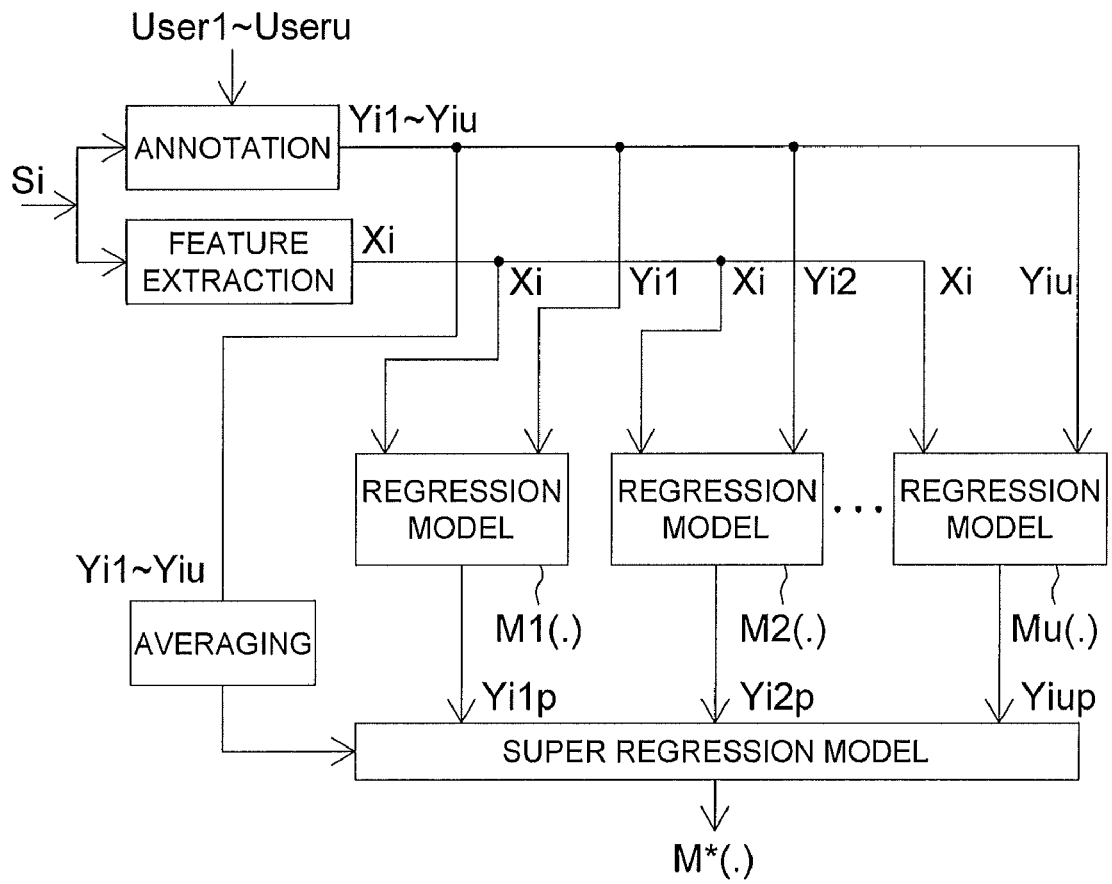
FIG. 5D shows another example of the training process of a generalized model.

For example, in an embodiment, the generalized model and the personalized model can be determined by linear regression analysis. In another embodiment, the generalized model includes: multiple regression models used for each predetermined perception, and a super regression model used for estimating the final result. In practical application, the generalized model is referred to as the "bag-of-user" model. The above embodiment which performs annotation by the users User1-Useru is taken for example. In the bag-of-user model, a bag of models are obtained by the annotation of each user. Then, the present embodiment of further assembles these models, and generates a general perception estimate by using a super regression model. Referring to FIG. 5D, another example of the training process of a generalized model is shown. Multiple regression models are denoted by M1 (.)-Mu (.), and the estimation result Yi* of the regression model M1 (.)-Mu (.) can be expressed as $Yi^*=Yi1p-Yiup$, wherein $Yi1p$-$Yiup$ respectively indicate the results of estimation of multiple regression models M1 (.)-Mu (.) based on the feature Xi of the information piece Si, that is, M1 (Xi)-Mu (Xi). The super regression model can be denoted by M* (.). In an embodiment with training of the super regression model, the error between the M* (Yi*) and the average of the predetermined perceptions Yi1-Yiu is minimized. Thus, the general perception estimate generated by the super regression model can be regarded as the aggregation of the opinions of the u users User1-Useru.

Moreover, if the information retrieval system 300 stores all of the personal perception estimates applicable to the users of the computing devices PC1-PCn in the database 310, the database 310 needs to provide larger storage space. In another embodiment, the processing unit 322 can categorize the personal perception estimates by comparing all personal perception estimates applicable to the users of the computing device PC1-PCn, thereby avoiding using a large-volume database 310. For example, the processing unit 322 can divide the personal perception estimates into M (such as 100) categories according to the comparison of cosine similarity of the personal perception estimates. As such, the database 310 only needs to store the M categories of personal perception estimate. After that, when another user of a computing device provides feedback, the processing unit 322 determines which of the M categories of the personal perception estimates is applicable to the user, and then selects the corresponding personalized model to provide service.

As indicated in the above disclosure, the information retrieval system disclosed in the above embodiments of the invention uses a two-stage structure combining the generalized model and the personalized model. In an exemplary embodiment, the generalized model can be off-time trained in advance, and regarded as a model focused on learning the relationships between the feature and the general perception of each information piece (such as music). The personalized model is on-line trained in response to the user's feedback, and can be regarded as a model focused on learning the user's personal characteristics (such as residual between personal and general perception). Thus, the information retrieval system can perform estimation through a generalized model and a trained personalized model with respect to information pieces and different users, and can be viewed as a personalized information retrieval system for simulating individual differences.

In other embodiments, like the personalized model, a generalized model can also on-line create the relationships between the information piece and general perception, so that the users can provide labels to multiple information pieces. For example, a user's feedback perception of each information piece can be used as other users' general perception or predetermined perception of the information piece. Thus, if a particular user provides his feedback, for other users, the feedback can be used for training the generalized model. However, the invention is not limited thereto, and any embodiments, which allow the personalized model to be trained by simulating individual differences through a user's feedback, and obtain the personalized perception estimates applicable to the user according to the personalized model and the generalized model, are feasible embodiments.

In the above embodiments, the perception of the user for retrieval is exemplified for elaborating the retrieval of associated information pieces. In other embodiments of the invention, the perception for retrieval can go with other condition with parameter, such as key words or values about feature of the content, to perform conditional search about perception, for example, a search about perception in a way similar to Boolean search. An example is taken where a one-dimensional perception from sadness to happiness is indicated by a value ranging from 0 to 1. When the perception is denoted by a value such as 0.8, the perception can go with at least one key word such as the singer's name "John Lennon", or a feature such as "quick rhythm", so that the information pieces matching the above parameters are searched for suitable information pieces with respect to the perception of 0.8. Thus, in other embodiments, the server 320 can further perform conditional retrieval about perception. The corresponding retrieval instruction can further include retrieval parameters or retrieve conditions in addition to at least one perception for retrieval.

Besides, according to the embodiment of the retrieval system of FIG. 3, in some embodiments, the server 320 can be implemented as a content provider website or a search website. The end-user device, such as a computing device or a handheld device, can interact with and search the server 320 through a website browser or a program (such as iTunes-like program) with communication function to the server 320 and even download or play the content or information piece. The network NW can be implemented by a wired network or a wireless network, such as a local area network, an Internet network or a mobile communication network. In other embodiments, the database 310 and the server 320 can be integrated into one system, or can be separated and operate at different sites. In another embodiment, the information retrieval system can be implemented as an independent system or device or included in one device such as a juke box or a karaoke player in order for the user to retrieve or even play the retrieval result with.

The information retrieval system of FIG. 3 is exemplified by the implementation in a server, but the invention is not limited thereto. In another embodiment of the invention, the information retrieval system can be implemented as, but not limited to, a handheld electronic device, such as a mobile phone, a personal digital assistant (PDA), a multi-media player, an iPhone, an iPod, or other devices of the like.

Figure 6:
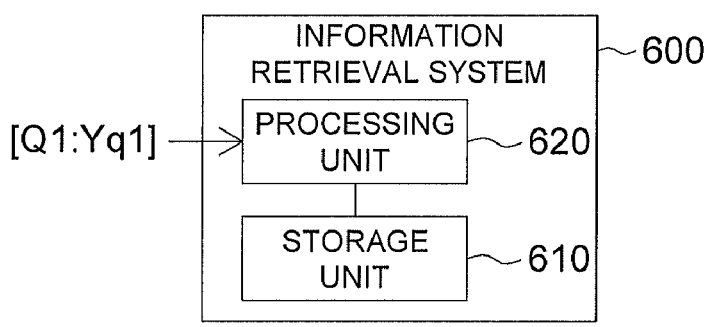
FIG. 6 shows a block diagram of an information retrieval system according to another embodiment of the invention.

FIG. 6 is a block diagram of an information retrieval system according to another embodiment of the invention. In the present embodiment, the information retrieval system 600 can be implemented as the handheld electronic device, which includes a storage unit 610 and a processing unit 620. Compared with the information retrieval system 300 of FIG. 3 associated with the server, the storage unit 610 of the present embodiment has the functions of a storage unit 324 and/or a database 310, while the processing unit 620 has the functions of the processing unit 322.

For example, the processing unit 620 can detect a retrieval instruction Q1. The retrieval instruction includes a user's perception for retrieval Yq1. Then, in response to the retrieval instruction Ql, the processing unit 620 further retrieves at least one information piece matching the perception of the user for retrieval from multiple personal perception estimates of the N information pieces stored in the processing unit 620. According to the generalized model and the personalized model disclosed in the above embodiments, each personal perception estimate denotes the user's subjective concept-based estimate of the information piece. Thus, the processing unit 620 can present the at least one information piece by at least one of the display and the speaker (not illustrated) or other ways of implementation, thereby providing an information piece matching the user's expectation.

The embodiment of the invention further discloses a computer readable storage medium, in which a program is stored. The program can be used for implementing the digital data processing method for information retrieval disclosed in the above embodiments of the invention. The computer readable storage medium of the present embodiment can be one or more optical storage media, such as includes a CD, a DVD, an HD-DVD, or a blu-ray DVD, magnetic storage medium, such as include floppy disc, hard disc, magnetic disc, or magnetic optical disc, or electronic storage medium such as ROM, RAM, or flash, or firmware.

According to the digital data processing method for information retrieval and the computer readable storage medium and the information retrieval system thereof that are disclosed in the above embodiments of the invention, the personalized model can be trained by simulating individual residual through the user's feedback. Afterwards, the personalized perception estimates applicable to the user can be obtained according to the personalized model and the generalized model. Thus, the estimation is more accurate and the effectiveness of the information retrieval is increased.

While the invention has been described by way of examples and in terms of preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A digital data processing method for a retrieval system, the retrieval system comprising a processing unit, the digital data processing method comprising:
    detecting at least one feedback instruction by the processing unit, the feedback instruction comprising at least one feedback perception, the feedback perception indicating feedback from a user on one of a plurality of information pieces;
    for the feedback perception, determining a residual perception by the processing unit according to comparison between the feedback perception and a general perception of the corresponding information piece;
    training a personalized model by the processing unit according to at least one corresponding feature and the corresponding residual perception of the information piece on which the feedback perception is provided;
    determining a personal perception estimate of the information piece by the processing unit according to at least a generalized model and the personalized model trained by the processing unit; and
    providing an information retrieval service accordingly,
    wherein each personal perception estimate represents a subjective concept-based estimate of the user of the corresponding information piece; and
    wherein denoting the generalized model by $M1(.)-Mu(.)$, an estimation result $Yi^*$ of a regression model $M1(.)-Mu(.)$ can be expressed as $Yi^*=Yi1p-Yiup$, wherein $Yi1p$ and $Yiup$ respectively indicates an estimation result of regression model $M1(.)-Mu(.)$ based on a feature $Xi$ of information pieces $Si$, wherein a general perception estimate generated by a generalized model can be regarded as the aggregation of opinions of users $User1$-$Useru$, and wherein the generalized model denotes a relationship between at least one corresponding feature and a plurality of corresponding predetermined perceptions of each of the information pieces.

2. The digital data processing method according to claim 1, wherein the step of determining the personal perception estimate comprises:
    obtaining a general perception estimate corresponding to each of a portion of the information pieces by the processing unit through the generalized model;
    obtaining a residual perception estimate corresponding to each of the portion of the information pieces by the processing unit through the personalized model trained by the processing unit; and
    determining the personal perception estimate of each of the portion of the information pieces by the processing unit according to a sum of the general perception estimate and the residual perception estimate.

3. The digital data processing method according to claim 1, wherein the step of determining the personal perception estimate comprises:
    determining the corresponding personal perception estimate of the information piece on which feedback is provided, by the processing unit according to the feedback perception.

4. The digital data processing method according to claim 1, wherein the step of providing information retrieval service comprises:
    detecting by the processing unit a retrieval instruction comprising a perception for information retrieval by the user; and
    retrieving at least one information piece matching the perception for information retrieval by the processing unit from the personal perception estimates associated with the information pieces in response to the retrieval instruction.

5. The digital data processing method according to claim 1, further comprising:
    providing the generalized model by the processing unit, the generalized model denoting the relationship between the at least one corresponding feature and a plurality of corresponding predetermined perceptions associated with each of the information pieces,
    wherein for each of the information pieces, the corresponding general perception is associated with an average of the corresponding predetermined perceptions.

6. The digital data processing method according to claim 1, wherein the information pieces comprise a plurality of files, and the files include at least one type of multimedia files of music, image, video, and text.

7. The digital data processing method according to claim 1, wherein the information pieces comprise music files, and each of the music files has at least one feature of rhythm, tone, and Mel-frequency cepstral coefficient (MFCC).

8. The digital data processing method according to claim 1, wherein the personalized model is trained by the processing unit according to support vector regression (SVM).

9. The digital data processing method according to claim 1, further comprising determining a personal perception estimate of an additional test information piece by the processing unit, wherein the step of determining the personal perception estimate of the additional test information piece comprises:
   obtaining at least one feature of the test information piece by the processing unit;
   obtaining a corresponding general perception estimate of the test information piece by the processing unit according to the at least one feature of the test information piece and the generalized model;
   obtaining a corresponding residual perception estimate of the test information piece by the processing unit according to the at least one feature of the test information piece and the personalized model; and
   determining the personal perception estimate of the test information piece by the processing unit according to a sum of the general perception estimate and the residual perception estimate.

10. A nontransitory computer readable storage medium configured to store a plurality of computer instructions, wherein the digital data processing method of claim 1 is performed after an electronic device performs the computer instructions.

11. An information retrieval system, comprising:
   a database configured to store a plurality of information pieces and a plurality of corresponding personal perception estimates, wherein each of the personal perception estimates denotes a subjective concept-based estimate of a user of one of the information pieces;
   a storage unit configured to store model parameters of a generalized model and model parameters of a personalized model, wherein the generalized model denotes a relationship between at least one corresponding feature and a plurality of corresponding predetermined perceptions of each of the information pieces; and
   a processing unit configured to detect a feedback instruction, the feedback instruction comprising at least one feedback perception, the feedback perception corresponding to one of the information pieces,
   wherein the processing unit further determines a residual perception according to comparison between the feedback perception and a general perception for the corresponding information piece of the feedback perception, and the general perception is obtained according to the predetermined perceptions of the corresponding information piece,
   wherein the processing unit further changes the model parameters of the personalized model according to at least one corresponding feature and the corresponding residual perception of at least the corresponding information piece of the feedback perception so as to train the personalized model,
   wherein the processing unit further determines the personal perception estimate of each of the information pieces according to at least the generalized model and the trained personalized model so as to provide information retrieval service accordingly; and
   wherein, denoting the generalized model by $M1(.)$-$Mu(.)$, an estimation result $Yi^*$ of a regression model $M1(.)$-$Mu(.)$ can be expressed as $Yi^*=Yi1p-Yiup$, wherein $Yi1p$ and $Yiup$ respectively indicates an estimation result of regression model $M1(.)$-$Mu(.)$ based on a feature $Xi$ of information pieces $Si$, wherein a general perception estimate generated by a generalized model can be regarded as the aggregation of opinions of users $User1$-$Useru$, and wherein the generalized model denotes a relationship between at least one corresponding feature and a plurality of corresponding predetermined perceptions of each of the information pieces.

12. The information retrieval system according to claim 11, wherein when determining the personal perception estimate of each of the information pieces, the processing unit obtains a general perception estimate corresponding to the information piece through the generalized model, obtains a residual perception estimate corresponding to the information piece through the trained personalized model, and determines the personal perception estimate of the information piece according to a sum of the general perception estimate and the residual perception estimate.

13. The information retrieval system according to claim 11, wherein the processing unit further, determines the personal perception estimate of the corresponding information piece according to the feedback perception.

14. The information retrieval system according to claim 11, wherein the processing unit further detects a retrieval instruction, the retrieval instruction comprising a perception for information retrieval of a user, and
   wherein the processing unit, in response to the retrieval instruction, further retrieves at least one information piece matching the perception for information retrieval from the personal perception estimates of the information pieces.

15. The information retrieval system according to claim 11, wherein the general perception is associated with an average of the predetermined perceptions for the corresponding information piece of the feedback perception.

16. An information retrieval system, comprising:
   a database configured to store a plurality of information pieces and a plurality of corresponding personal perception estimates, wherein each of the personal perception estimates denotes a subjective concept-based estimate of a user of one of the information pieces;
   a storage unit configured to store model parameters of multiple generalized models and model parameters of a personalized model, wherein denoting the multiple generalized models by $M1(.)$-$Mu(.)$, an estimation result $Yi^*$ of a regression model $M1(.)$-$Mu(.)$ can be expressed as $Yi^*=Yi1p-Yiup$, wherein $Yi1p$ and $Yiup$ respectively indicates an estimation result of multiple regression models $M1(.)$-$Mu(.)$ based on a feature $Xi$ of information pieces $Si$, wherein a general perception estimate generated by a generalized model can be regarded as the aggregation of opinions of users $User1$-$Useru$, and wherein the generalized model denotes a relationship between at least one corresponding feature and a plurality of corresponding predetermined perceptions of each of the information pieces; and
   a processing unit configured to detect a feedback instruction, the feedback instruction comprising at least one feedback perception, the feedback perception corresponding to one of the information pieces, wherein the processing unit further determines a residual perception according to a comparison between the feedback perception and the general perception for the corresponding information piece of the feedback perception, and the general perception is obtained according to the predetermined perceptions of the corresponding information piece, wherein the processing unit further changes model parameters of the personalized model according to the at least one corresponding feature and the corresponding residual perception of the corresponding information piece of the feedback perception so as to train multiple regression models, and wherein the processing unit further determines the personal perception estimate of each of the information pieces according to at least one of the generalized model and the trained personalized model, so as to provide information retrieval service accordingly.

17. A digital data processing method according to claim 16, wherein the processing unit determines the personal perception estimate of each of the information pieces according to the generalized model and the trained personalized model.

* * * * *